US012513806B2

(12) United States Patent
Van De Sluis et al.

(10) Patent No.: US 12,513,806 B2
(45) Date of Patent: Dec. 30, 2025

(54) LIGHTING CONTROL BASED ON A CO-LOCATED ACTIVE ANTENNA ARRAY

(71) Applicant: SIGNIFY HOLDING B.V., Eindhoven (NL)

(72) Inventors: Bartel Marinus Van De Sluis, Eindhoven (NL); Matthias Wendt, Würselen (DE); Maurice Herman Johan Draaijer, Ittervoort (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/284,724

(22) PCT Filed: Mar. 29, 2022

(86) PCT No.: PCT/EP2022/058271
§ 371 (c)(1),
(2) Date: Sep. 28, 2023

(87) PCT Pub. No.: WO2022/207641
PCT Pub. Date: Oct. 6, 2022

(65) Prior Publication Data
US 2024/0179823 A1   May 30, 2024

(30) Foreign Application Priority Data

Apr. 2, 2021 (EP) .................................... 21166833

(51) Int. Cl.
*H05B 47/175* (2020.01)
*H01Q 1/24* (2006.01)
(Continued)

(52) U.S. Cl.
CPC ........... *H05B 47/1965* (2024.01); *H01Q 1/24* (2013.01); *H05B 47/11* (2020.01); *H05B 47/14* (2020.01);
(Continued)

(58) Field of Classification Search
CPC .... H05B 47/1965; H05B 47/11; H05B 47/14; H05B 47/17; H05B 47/1985;
(Continued)

(56) References Cited

U.S. PATENT DOCUMENTS 10,812,992 B1   10/2020  Tran et al.
2012/0038281 A1*  2/2012  Verfuerth ............... H05B 45/10
                                                              315/152
(Continued)

FOREIGN PATENT DOCUMENTS

WO   2017058468 A1    4/2017
WO   2020234486 A1   11/2020
WO   2020255081 A1   12/2020

OTHER PUBLICATIONS

Nokia Bell Labs Demos 5G Light Fixtures and 90-GHz mmWave; https://disruptive.asia/nokia-bell-labs-5g-light-fixtures-90-ghz-mmWave, Dec. 7, 2020. 3 pgs.
(Continued)

*Primary Examiner* — Daniel D Chang

(57) ABSTRACT

A system (100) comprising one or more light sources (110) for illumination; an array of active antennas (120) configured to detect contextual information; and a controller (130) configured to obtain the contextual information from the array of active antenna; and control the one or more light sources based on the contextual information; wherein the array of active antennas (120) is shared with a co-located MIMO communication system, and the contextual information is related to one or more objects in an illumination area covered by the one or more light sources (110).

11 Claims, 3 Drawing Sheets

(51) Int. Cl.
*H05B 47/11* (2020.01)
*H05B 47/14* (2020.01)
*H05B 47/17* (2020.01)

(52) U.S. Cl.
CPC ......... *H05B 47/17* (2020.01); *H05B 47/1985* (2024.01)

(58) Field of Classification Search
CPC ........ H05B 47/115; H01Q 1/24; Y02B 20/40; G01S 13/4463; G01S 13/765; G01S 2013/0245; G01S 7/006; G01S 13/02; G01S 13/762; G01S 13/88
See application file for complete search history.

(56) References Cited

U.S. PATENT DOCUMENTS

| | | |
|---|---|---|
| 2017/0150578 A1 | 5/2017 | Dureiko et al. |
| 2018/0103897 A1 | 4/2018 | Amirouche |
| 2020/0182995 A1 | 6/2020 | Zeng et al. |
| 2020/0383173 A1* | 12/2020 | Aaron ................. F21V 23/0435 |

OTHER PUBLICATIONS

Bjornson et al.; "Massive MIMO is a Reality-What is Next? Five Promising Research Directions for Antenna Arrays", Jun. 12, 2019, 20 pgs.

* cited by examiner

LIGHTING CONTROL BASED ON A CO-LOCATED ACTIVE ANTENNA ARRAY

CROSS-REFERENCE TO PRIOR APPLICATIONS

This application is the U.S. National Phase application under 35 U.S.C. § 371 of International Application No. PCT/EP2022/058271, filed on Mar. 29, 2022, which claims the benefit of European Patent Application No. 21166833.0, filed on Apr. 2, 2021. These applications are hereby incorporated by reference herein.

FIELD OF THE INVENTION

The invention relates to the field of lighting control. More particularly, various methods, apparatus, systems, and computer-readable media are disclosed herein related to lighting control based on advanced contextual information.

BACKGROUND OF THE INVENTION

In the last decade, capabilities of mobile networks have increased dramatically with the global deployment of 5G cellular, and in the meanwhile users' expectations also rise, which are boosted by the diverse applications running on smartphones and other electronic devices. As already known, a multiple-input and multiple output (MIMO) system makes use of multiple antennas to enhance connectivity and offer better speeds and user experiences. With the design of 5G New Radio (NR) networks, MIMO becomes "massive" and crucial for 5G NR deployments.

As an extension of a conventional MIMO system, massive expands beyond the legacy systems by adding a much higher number of antennas on the base station. The "massive" number of antennas helps focus energy, which brings drastic improvements in throughput and efficiency. These advancements are all aimed at achieving performance improvements needed to underpin the 5G experiences in this new era. Along with the increased number of antennas, both the network and mobile devices implement more complex designs to coordinate MIMO operations. For example, beamforming technique is used to adapt the radiation pattern of the antenna array to a particular scenario. Similarly, massive MIMO also acknowledges that in real-world systems, data transmitted between an antenna and a user terminal—and vice versa—undergoes filtering from the surrounding environment, such that the signal may be reflected off buildings and other obstacles, and these reflections will have an associated delay, attenuation, and direction of arrival. Therefore, information related to the surrounding environment, or referred to as contextual information, is extensively processed in a massive MIMO system.

On the other hand, as part of a smart building or a smart city, a conventional lighting system is also evolving towards a smart lighting system, which is expected to provide enhanced energy efficiency, user comfort, productivity, operational efficiency, and wellbeing of people. To achieve this goal, more intelligence is required by the lighting system, such as knowledge about the presence, number, position, and motion properties of nearby users and devices. However, it may be quite expensive for a lighting system to derive such intelligence from scratch.

US2020182995A1 relates to methods, apparatus and systems for outdoor target tracking. The tracking system requires a pair of transmitter and receiver, with one being a located device at a known location and the other being a moving device.

SUMMARY OF THE INVENTION

The inventors recognize that the deployment of massive MIMO communication systems rely on the support of an infrastructure, while the existing lighting infrastructure may be a good candidate. On the other hand, the enriched contextual information obtained by a massive MIMO system with advanced signal processing may also be exploited to nurture an intelligent lighting control system. Thus, the co-location of the two systems may form a win-win situation.

In view of the above, the present disclosure is directed to methods, apparatus, systems, computer program and computer-readable media for a lighting system with a co-located active antenna array, and the contextual information obtained by the active antenna array is used for lighting control. Thus, an advanced smart lighting control is achieved with reduced overhead. More particularly, the goal of this invention is achieved by a system as claimed in claim 1, by a method of a system as claimed in claim 10, and by a computer program as claimed in claim 11 In accordance with a first aspect of the invention a system is provided. A system being part of a lighting device or a distributed lighting system comprising an array of active antennas for massive MIMO communication is configured to detect contextual information; more than one light source for illumination with each one of the more than one light source co-located with one or more antenna elements out of the array of active antennas; and a controller configured to: obtain the contextual information from the array of active antenna; obtain the mapping between each light source and the corresponding co-located one or more antenna elements out of the array of active antennas; and control each light source based on the corresponding contextual information obtained from the corresponding co-located one or more antenna elements; wherein the contextual information is related to one or more objects in an illumination area covered by the one or more light sources, and the contextual information comprises at least one of the following aspects regarding the one or more objects: a presence, a location/position, a total number, an activity, and a motion property.

Massive MIMO is a leading 5G technology with the aid of a large number of antennas, such as an array of active antennas, at the base station. Preferably, the active antenna array operates in a frequency band above 3 GHz according to a 5G cellular standard. Lighting infrastructure on the ceiling for the indoor scenario or the light poles for the outdoor scenario represent a promising candidate to accommodate the antenna arrays for massive MIMO. In the meantime, an antenna array of the claimed system is shared with a co-located massive MIMO system. Advantageously, in the massive MIMO system the active antenna array is used not only for communication, but also for capturing contextual information to facilitate high-resolution beamforming in the communication system. As disclosed above, contextual information, in particular spatiotemporal contextual information, regarding people and/or a device in the area of interest may also be used to provide improved lighting control effects and experiences.

The one or more objects may be a person, an animal, a user device, or an electronic device. The object may also be an asset identifiable by a tag attached on or integrated in, such as a piece of furniture, a mannequin, a catering cart, a fire extinguisher, or something else. Since the tag may send beacons periodically or continuously with more information regarding the asset, the antenna array will capture such beacon signals to enrich the contextual information.

The contextual information may also be obtained by the antenna array via passive sensing. For example, the sensing data is obtained by observing reflected electromagnetic signals from a moving object. The object may be a person, a user device, or an electronic device. The user device may be a bike, a car, or an electric vehicle. The electronic device may be a smartphone, a tablet, a laptop, a smart TV, or another electronic device. For the user device and the electronic device with an active communication link, more information may be obtained by the antenna array by detecting continuously the RF signals from the device. The passive sensing and active sensing may also be used in combination.

Thus, it is beneficial that the array of active antennas is co-located with the one or more light sources in the same system, and the contextual information obtained by the antenna array is also shared with the system for lighting control. In this way, no dedicated sensors will be needed to realize a smart lighting control.

Beneficially, the contextual information comprises at least one of the following aspects regarding the one or more objects: a presence, a location/position, a total number, an activity, and a motion property.

The contextual information may cover different aspects about the people and the devices in the environment. For example, a moving object indicates occupancy or presence information. On top of that, a total number of persons or user devices may also be identified. Depending on the antenna array is arranged on as a 1D array or 2D array, either a 2D location or 3D position information may also be derived. Given the spatiotemporal information, the contextual information may also include a motion property of an object, such as a movement direction, a speed, an acceleration, and a movement trajectory. Furthermore, by correlating data regarding different objects, further contextual information can be derived, such as crowdedness in a certain region or an activity being carried out.

Preferably, when the one or more objects comprising at least one user device or electronic device, the contextual information may be obtained by an active communication link between the user device or electronic device with the MIMO communication system, such that the contextual information further comprises at least one of the following aspects regarding the at least one user device or electronic device: a state, a type, a preference or profile setting, and a running application on the at least one user device or electronic device.

The state of a user device or electronic device can be if the device is in operation or not, such as if a smartphone is in use or not or if an e-bike is moving or static. Furthermore, depending on an active link with the device or classification via sensing data, the system may classify a detected object to distinguish the type of the device, such as a car, a bike, an e-vehicle, a smart watch, a smartphone, a tablet, a laptop, a smart TV, etc.

When the object has an active link with the antenna array, a preference or profile setting defined by a user of the device may also be acquired as part of the contextual information. The system may further get aware of an application that is running on the device. Such information can be very helpful for lighting control to improve user experience. For example, when the user is using the tablet to watch a movie, a different light recipe may be applied as compared to another scenario when the user is using the tablet to make a video call.

In one example, the controller is further configured to switch on/off or to dim up/down the one or more light sources based on the contextual information.

As a very basic operation, a light may be controlled by the controller to switch on/off or to dim up/down automatically depending on an occupancy information, such as the presence of at least one object in the illumination area. The controller may also dim up/down the light depending on an activity of the objects in the area.

In another example, the controller is further configured to control the one or more light sources to create a segmented lighting effect based on the contextual information.

Depending on the crowdedness or different activities in different subareas, a segmented lighting effect may satisfy the application scenario. Given the movement of the objects, such segmented lighting effect may also be updated dynamically to follow the motion of the objects. Based on a prediction of a moving trajectory, a certain lighting effect may be rendered next to and ahead of the user. As another example, in streets, tunnels or parking garages continuous lighting effect may be created by generating an anticipatory light effect moving along with and ahead of a moving car based on a detected current location.

In a further example, the controller is further configured to control the one or more light sources to render a pixelated luminous pattern based on the contextual information.

When the one or more light sources form an LED array or LED stripe, a pixelated luminous pattern may be rendered with a high resolution or a high contrast. This can be quite attractive to a stadium use case, such as the pixelated patterns follow the movements of a crowd when cheering for a goal.

Advantageously, the controller is further configured to control the one or more light sources based on the combination of the contextual information and an ambient light condition and/or time-of-day.

Related lighting control parameters, such as ambient light condition and/or time-of-day, may be used in combination with the contextual information for more advanced control. Such parameters may be obtained from an electronic device in the area via a communication link. Alternatively, such parameters may also be detected by sensors deployed locally. For example, the ambient light condition may be detected by an ambient light sensor. The time-of-day information may be obtained by a local clock, which may also be derived based on a geo-location information. Furthermore, the ambient light condition may also be determined based on the combination of time-of-day, geo information, and optionally weather information.

Beneficially, the system comprising more than one light sources, wherein each light source is co-located with one or more antenna elements out of the array of active antennas.

Each light source may only cover a subarea or a segment over the entire illumination area covered by the system. Hence, it is preferred that the light output of each light source or segment could be controlled based on an object being detected in or close to that subarea. Therefore, in a desired setup, each light source is co-located with one or more antenna elements out of the array of active antennas. In practice, a 1D or 2D active antenna array may be integrated in a 1D or 2D light surface.

Preferably, wherein each light source is associated with one or more antenna elements and the controller is further configured to obtain the mapping between each light source and the corresponding one or more antenna elements out of the array of active antennas.

Such a deployment enables a seamless integration between an advanced communication system and a smart lighting system. Individual light source can be controlled according to contextual information with a fine granularity obtained from the corresponding one or more antenna elements out of the array of active antennas.

With the mapping between each light source and corresponding antenna elements, the controller may have the flexibility to control the light source to render a light effect according to a local contextual information, or to contribute to a collective light effect following a more global contextual information.

In one setup, the controller is shared by the one or more light sources for lighting control and the array of active antennas for deriving the contextual information.

With this option, the controller may take care of the processing to derive the contextual information based on certain antenna outputs. For example, the antenna outputs may be raw digital signals related to the spatial streams captured by the antennas. Further processing in the controller can be related to first calculating angle-of-arrival (AOA) information or channel state information (CSI), and then to derive the contextual information. It may also be the case that more complicated contextual information is provided by the antenna array, and further processing is implemented in the controller to derive certain level of abstraction or adjustment to customize the contextual information more suitable for use in a lighting control scenario.

Alternatively, the array of active antennas comprises one or more dedicated processors; the one or more dedicated processors are configured to derive the contextual information, and to provide the contextual information to the controller.

With this option, the array of active antennas has its own computing capability. It may be an option that the multiple antenna elements share a single dedicated processor. It may also be an option that a subset of antenna elements shares one dedicated processor. And there is more than one processor located in the system. Thus, the input may be collected and processed in a distributed manner. Making use of such distributed computation power in an active antenna array may have better support to more complex lighting effects.

Advantageously, the array of active antennas is further configured to carry out beamforming in the MIMO communication system.

As part of the communication system, the array of active antennas also performs beamforming by steering the beams to different directions to construct the array response to the detected contextual information, such as a presence, a location/position, a total number, an activity, and a motion property of one or more objects in the area. Accordingly, the detected contextual information is also adapted in real-time to the change of the one or more objects in the environment.

Advantageously, the system is either a part of a lighting device or a part of a distributed lighting system.

The disclosed system may be comprised in the same housing as part of a lighting device or a luminaire. For example, a light source may comprise an array of light-emitting elements (e.g., linear or 2D LED array), and the LED array and antenna array share the same substrate in the lighting device.

Alternatively, the disclosed system is not comprised in a single housing but distributed in the area as part of a distributed lighting control system. For example, both the light sources and the antenna elements are distributed in the area, while each light source is associated with one or more antenna elements located in a close surrounding. Thus, high-resolution contextual information may be derived for each light source, respectively, by the co-located one or more antenna elements.

In accordance with a second aspect of the invention a method of a system is provided. A method of a system, the method comprises the system: obtaining contextual information detected by an array of active antennas comprised in the system; obtaining a mapping between each light source out of more than one light source comprised in the system and the corresponding co-located one or more antenna elements out of the array of active antennas; and controlling each light source based on the corresponding contextual information obtained from the corresponding co-located one or more antenna elements; wherein the contextual information is related to one or more objects in an illumination area covered by the one or more light sources, and the contextual information comprises at least one of the following aspects regarding the one or more objects: a presence, a location/position, a total number, an activity, and a motion property.

The invention may further be embodied in a computer program comprising code means which, when the program is executed by an apparatus comprising processing means, cause the processing means to carry out the method of the apparatus as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

The embodiments set forth below represent information to enable those skilled in the art to practice the embodiments and illustrate the best mode of practicing the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

Figure 1:
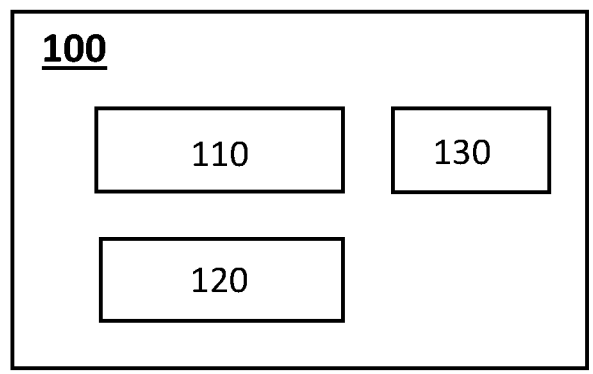
FIG. 1 schematically demonstrates the basic components comprised in a system.

FIG. 1 schematically demonstrates the basic components comprised in a system 100. The one or more light sources 110 are used for illumination. Commonly used light sources may be an incandescent filament lamp, a fluorescent lamp (linear), a compact fluorescent lamps (such as a folded fluorescent light tube), a discharge lamp, or a Light Emitting Diodes (LED) or LASER. It may also be a LED array or LED stripe. The co-located array of active antennas 120 are used to detect contextual information, which may be used for both beamforming in a MIMO communication system and lighting control. A controller 130 is used to obtain the contextual information from the array of active antenna; and control the one or more light sources based on the contextual information. The contextual information is related to one or more objects 150 in an illumination area covered by the one or more light sources 110, and the one or more objects 150 may be a person, an animal, a user device, an electronic device, or an asset with an attached or integrated tag. Since the tag may send beacons periodically or continuously, more information regarding the asset can be obtained.

With the increasing requirements on data rates, massive MIMO system is going to play an important role in the future to satisfy such requirements. A huge number of antennas are required in a massive MIMO system. It is believed that future infrastructures in (semi-)public areas may be formed by integrated LED arrays and massive MIMO active antenna arrays in a single infrastructure. In order to enable reliable beamforming, the active antenna system has a lot of intelligence in relation to the number, location and movement directions of one or more objects in the surroundings, such as a person, a user device, or an electronic device. If such intelligence is shared with the co-located lighting system, the light could be more intelligently controlled based on this input, without requiring any further sensors in the lighting infrastructure. Therefore, it is advantageous to have a system comprising both one or more light sources, such as in the form of an array of light sources, and an array of active antennas, whereby the system controls the light based on input from the (integrated) active antenna array. The active antenna array continuously detects the presence, number, location, and movement properties of objects in the area. The controlled light output may range from presence-based switching or dimming the light, creating local (segmented) light effects moving along with users or rendering pixelated luminous patterns based on movement properties of a detected user device. With certain devices connected to the antenna array with a radio link, it may also allow the system to identify users and take personal preferences or user profile into account when controlling the lights.

Possibly, the antenna node and lighting nodes share a controller, or alternatively, there is a pre-defined relation between antenna nodes and lighting nodes. The active antenna array may further comprise one or more dedicated processors for deriving the contextual information or some other local processing. In the simplest implementation, light nodes are activated (or dimmed up) which are co-located with or surrounding the antenna clusters which are detected to be near detected user devices, thereby enabling a simple light-on-demand solution.

Figure 2:
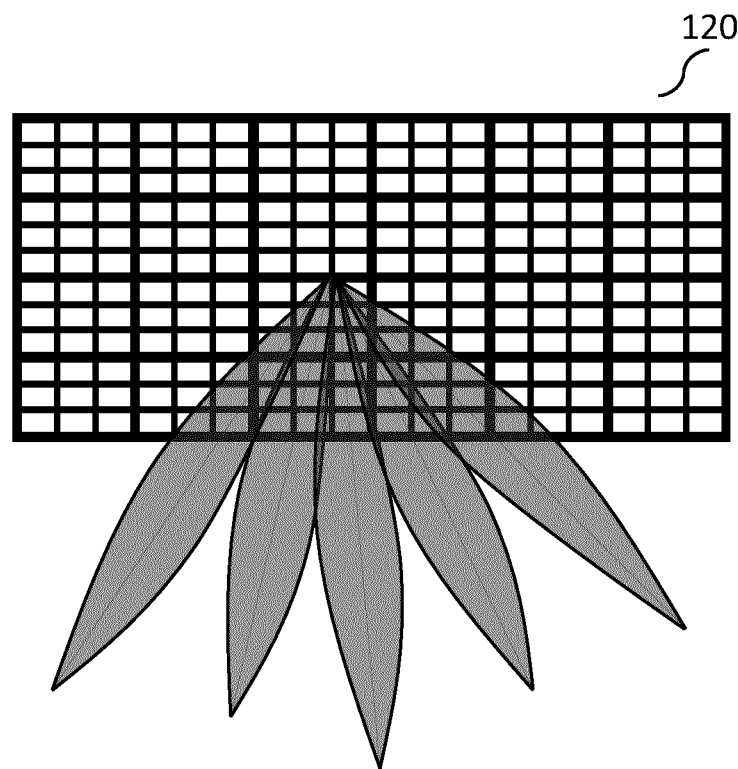
FIG. 2 illustrates an array of active antenna.

FIG. 2 exemplarily illustrates an array of active antenna 150. As already known, a massive MIMO system comprises many antennas in an antenna array enabling beamforming (directional signal transmission/reception). Currently 5G antenna arrays consist of an array of small antennas combined with a lot of intelligence enabling spatial multiplexing of signals in different directions. Future antenna arrays will combine many small antennas in a massive MIMO array, which will be located closer to the user area, resulting in a shorter distance between users and the antennas.

In one implementation, the antenna spacing is uniform in the antenna array. By sending the same signal from all antennas, but with different phase-shifts, the beam can be steered in different angular directions and thereby make the directivity of the radiated signal different from the directivity of the individual antennas. When the antennas are deployed on a one-dimensional (e.g., horizontal) line, the ULA may only steer beams in the two-dimensional (2D) azimuth plane. Reversely connected devices can be localized in that plane at reception.

Of course, besides linear antenna arrays, large 2D antenna arrays may also be deployed to make it possible to control both the azimuth and elevation angle of a beam. This is called 3D beamforming or "full-dimensional MIMO" hence supporting localization of user devices in the half room perpendicular to the antenna surface. For instance, the antenna array could be a large planar volume, or could be integrated on a large planar surface, such as a building façade.

Figure 3:
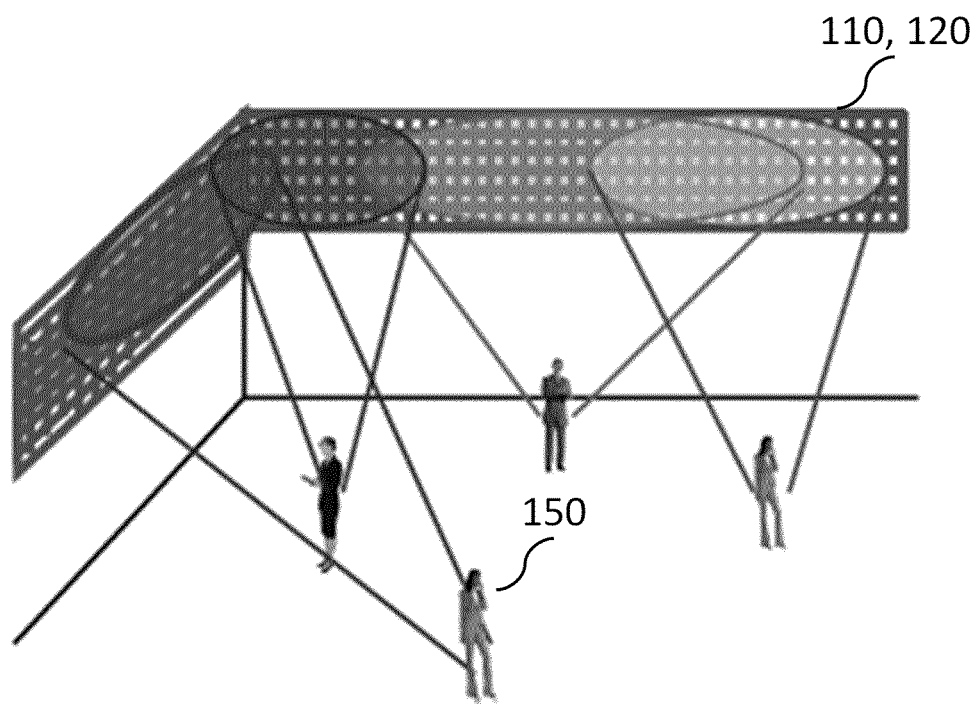
FIG. 3 demonstrates an example of the disclosed system.

FIG. 3 demonstrates an example of the disclosed system. The one or more lights sources 110 and the array of active antennas 120 are co-located and directed to the same illumination area, which is also the communication area for the MIMO communication system. There are one or more objects 150 in the same area, which may be a person, a user device, or an electronic device. The user device may be a bike, a car, a drone, or an electric vehicle. The electronic device may be a smartphone, a smart watch, a tablet, a laptop, a smart TV, or another electronic device.

The contextual information may also be obtained by the antenna array via passive sensing. For example, the sensing data is obtained by observing reflected electromagnetic signals from a moving object. For the user device and the electronic device with an active communication link with the antenna array, more information may be obtained by detecting continuously the RF signals from the device. The passive sensing and active sensing may be used separately, or in combination.

Basically, any type of information regarding to the objects may be comprised as part of the contextual information, such as occupancy information, crowdedness information, activities of the people in the area, and the number, a position, a movement direction of a detected objects, or a type and a state of the detected devices, can be useful information for the lighting control.

In huge light installations like stadium lighting, to generate smooth dynamic effects like chasing is computationally intensive and occupies a lot of communication bandwidth in lighting connectivity. Making use of distributed computation power in active antenna arrays may support such complex lighting effects. In a more specific example, the system could have different segments, whereby each segment comprises both a LED array and an active antenna array. The light output of each segment could be controlled based on a property of an object detected in or near each segment.

Over the last decades, light sources have been developed to become compact with LEDs and used in (linear or 2D) LED arrays in combination with advanced processing to intelligently control individual light nodes, similar to the developments ongoing in the domain of antenna technology. An illustrated in the figure, various linear lighting structures may be installed with integrated active antenna arrays.

It may also be an option that a 2D light surface comprises an integrated 1D or 2D active antenna array. This could enable good RF connectivity in large indoor retail or hospitality environments. In addition, the luminous panel content could be adapted to the location of users or could adapt its output (and that of other nearby lighting devices) based on the number of people present. For instance, if a specific level of crowdedness is detected a light show may be activated. Thus, the light of each linear lighting segment could be controlled dependent on locally detected objects. The controller may also be configured to control individual light sources to contribute to a collective lighting effect according to a common scene detected by different segments.

Of course, the controller may be further configured to control light output based on the combination of contextual information and another parameter, such as ambient light condition and/or time-of-day. Such parameters may be obtained from a user device in the area via a communication link. Alternatively, such parameters may also be detected by sensors deployed locally. For example, the ambient light condition may be detected by an ambient light sensor. The time-of-day information may be obtained by a local clock, which may also be derived based on a geo-location information. Furthermore, the ambient light condition may also be determined based on the combination of time-of-day, geo information, and optionally weather information. This setup may be particularly beneficial to an outdoor lighting control system.

Figure 4:
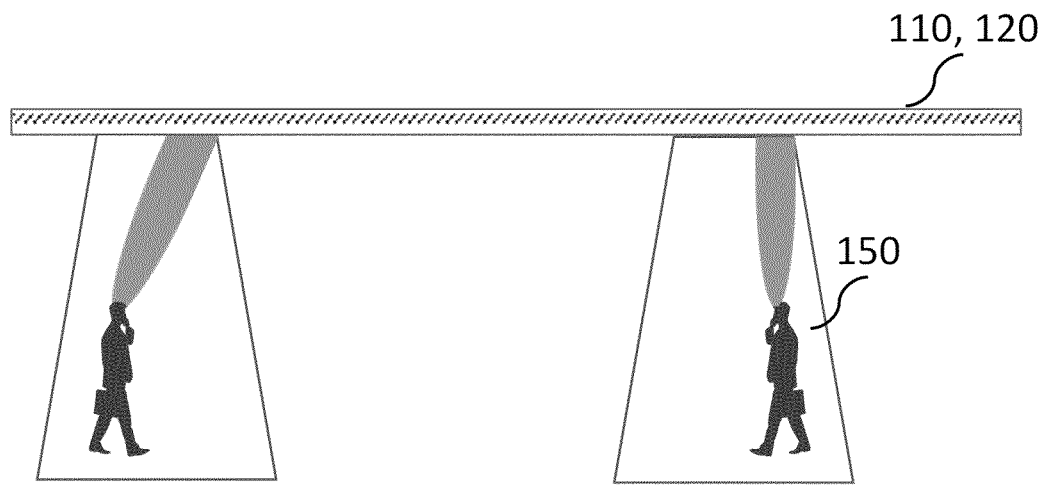
FIG. 4 demonstrates another example of the disclosed system.

FIG. 4 demonstrates another example of the disclosed system. The active antenna array is continuously detecting and predicting user device locations in order to reliably provide RF signal connections to those devices and provide seamless handover from access point to access point. Based on the detected user device movements, light effects may be generated. For instance, the detected movement direction may be used to render a local light effect at and ahead of the user. Even the form of the light effect may be adjusted with movement information. As an example, for a slow movement, it may render a round spot and for speedy movements multiple spots melt to an ellipse in the direction of the movement. These effects may only overlay a steady state low flux illumination.

In streets, tunnels or parking garages continuous light and antenna lights may be present, which generate an anticipatory light effect moving along with and ahead of the (fast) moving car based on detected current positions. In a similar way, the movements of a crowd in a stadium may be detected when cheering for a goal, or making a collective wave, and the (segmented, pixelated) light effect could respond to this.

When the object is an asset with an integrated or attached tag, many interesting use cases may also be enabled. For example, when a beacon tag is attached to a Christmas tree, with the disclosed system the surrounding illumination lights may be controlled in such a way to cooperate with the decorative lighting on the tree, such that the illumination lights automatically dim down to enhance the effect of the decorative lighting on the tree. For an asset with an integrated or attached tag, other examples regarding a special lighting effect achieved by the disclosed system may also be a mannequin puppet in a show room or a moveable cashier station, which has a decorative lighting. When there is no decorative lighting on the asset, the disclosed system may also enable some nice use cases. For example, a catering cart carrying the midnight soup gets highlight in a ball room by the lighting device of the disclosed system, or lights around some safety assets like a fire extinguisher or an Automated External Defibrillator AED machine are always at an elevated dim level to make those safety assets easy to be spotted.

As density of people as well as crowd movements can be monitored reliably, the light effect can be made easily instrumental in order to motivate crowd movements into certain direction. The device density information is much easier to obtain und substantially more accurate when compared to surveillance camera-based crowd management systems.

Furthermore, cars and sometimes also users have and carry multiple electronic devices. The combination of detecting these devices may provide additional contextual awareness, for example in a dense area individual users or cars can be identified (in an anonymous way of course if required) by pinpointing multiple radios at a certain location, especially when pinpointing a certain location or position is difficult to be achieved by sensing a single radio.

In parking garages, being able to track connected vehicles (and/or mobile devices on board) may enable to control dynamic signage shown by the lights to direct people in and out with less crowding on the way.

As another example, in certain areas the theft of public facilities and street signs happens quite often, which can be quite inconvenient and sometimes may lead to significant safety risk. Considering the number of facilities and street signs, automatic monitoring via a lighting infrastructure can be quite attractive. With the disclosed system, the presence of such public facilities and street signs may be monitored via passive sensing by means of active antenna array embedded in the lighting infrastructure. It may also be an option that battery powered or solar powered beacon tags are embedded in these facilities and street signs to further assist the sensing.

Commissioning may be done in a combined way to reduce installation effort as compared to commissioning the massive MIMO system and the lighting system separately. In another option, the commissioning of a lighting system may be done by means of a device which gets located first by means of the massive MIMO system. Light effects may be easily adjusted with the commissioning tool moving around, which can be accurately tracked by the MIMO system.

In another example, the presence of an array of light sources combined with RF transceivers can be used to realize a low-cost positioning system to locate a mobile device in the vicinity of the buildings equipped with the arrays. For many systems pre-knowledge of a location of a client device is of great benefit in terms of speed and power consumption. For example, GPS systems have a significant faster lock when having pre-knowledge on the area the device might be based on Wi-Fi SSID signals for example. In the same way MIMO systems can benefit from having pre-knowledge about the physical location of client device. The many light sources could cover a specific area in which the user (device) could be present. In this way the receiving device can be pinpointed with a low cost and less power-hungry optical detector. When having pinpointed the device the MIMO system can take over and realize a high bandwidth connection. By using the line of sight (optical way) as a start for pinpointing the location of a client device, the complexity in the RF domain (MIMO) can be avoided including its reflections and propagation issues and this is an advantage if many clients have to be located. In the same way the tracking of devices can be enhanced when using the optical tracking regularly (in the seconds) range for pedestrians.

Figure 5:
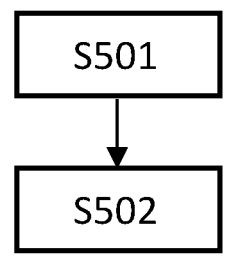
FIG. 5 shows a flow chart of a method of a system.

FIG. 5 shows a flow chart of a method 500 of the system 100. The method 500 comprises the system 100: in step S501, obtaining contextual information detected by an array of active antennas 120 comprised in the system 100; and in step S502, controlling one or more light sources 110 comprised in the system 100 based on the obtained contextual information; wherein the array of active antennas is shared with a co-located MIMO communication system, and the contextual information is related to one or more objects in an illumination area covered by the one or more light sources.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The terms "program" or "computer program" are used herein in a generic sense to refer to any type of computer code (e.g., software or microcode) that can be employed to program one or more processors or controllers.

The invention claimed is:

1. A system being part of a lighting device or a distributed lighting system comprising:
    an array of active antennas for massive multiple-input and multiple-output (MIMO) communication configured to detect contextual information;
    more than one light source for illumination with each one of the more than one light source co-located with one or more antenna elements out of the array of active antennas; and
    a controller configured to:
        obtain the contextual information from the array of active antennas;
        obtain a mapping between each light source and the corresponding co-located one or more antenna elements out of the array of active antennas; and
        control each light source based on the corresponding contextual information obtained from the corresponding co-located one or more antenna elements determined by the mapping;
    wherein the contextual information is related to one or more objects in an illumination area covered by the one or more light sources, wherein the one or more objects comprise at least one user device or electronic device, wherein the plurality of active antennas obtains the contextual information from the at least one user device or electronic device via an active communication link, and the contextual information comprises at least one of the following aspects regarding the one or more objects: a presence, a location/position, a total number, an activity, and a motion property.

2. The system of claim 1, wherein the contextual information further comprises at least one of the following aspects regarding the at least one user device or electronic device: a state, a type, a preference or profile setting, and a running application on the at least one user device or electronic device.

3. The system of claim 1, wherein the controller is further configured to switch on/off or to dim up/down the one or more light sources based on the contextual information.

4. The system of claim 1, wherein the controller is further configured to control the one or more light sources to create a segmented lighting effect based on the contextual information.

5. The system of claim 1, wherein the controller is further configured to control the one or more light sources to render a pixelated luminous pattern based on the contextual information.

6. The system of claim 1, wherein the controller is further configured to control the one or more light sources based on the combination of the contextual information and an ambient light condition and/or time-of-day.

7. The system of claim 1, wherein the controller is shared by the one or more light sources for lighting control and the array of active antennas for deriving the contextual information.

8. The system of claim 1, wherein the array of active antennas comprising one or more dedicated processors; the one or more dedicated processors are configured to:
    derive the contextual information; and
    provide the contextual information to the controller.

9. The system of claim 1, wherein the array of active antennas is further configured to carry out beamforming in a MIMO communication system that is co-located with the system.

10. A method of a system being part of a lighting device or a distributed lighting system, the system comprising an array of active antennas for massive multiple-input and multiple-output (MIMO) communication and more than one light source for illumination with each one of the more than one light source co-located with one or more antenna elements out of the array of active antennas, the method comprising the system:
    obtaining contextual information detected by the array of active antennas;
    obtaining a mapping between each light source out of the more than one light source and the corresponding co-located one or more antenna elements out of the array of active antennas; and
    controlling each light source based on the corresponding contextual information obtained from the corresponding co-located one or more antenna elements determined by the mapping;
    wherein the contextual information is related to one or more objects in an illumination area covered by the one or more light sources, wherein the one or more objects comprise at least one user device or electronic device, wherein the plurality of active antennas obtains the contextual information from the at least one user device or electronic device via an active communication link, and the contextual information comprises at least one of the following aspects regarding the one or more objects: a presence, a location/position, a total number, an activity, and a motion property.

11. A non-transitory computer readable medium comprising instructions which, when the instructions are executed by a system causes the system to execute the method of claim 10.

* * * * *